Patented Jan. 19, 1943

2,308,581

UNITED STATES PATENT OFFICE 2,308,581

COPOLYMERIZED SUBSTANCES CONTAINING METHACRYLIC ANHYDRIDE

Carl E. Barnes, Worcester, Mass., assignor, by mesne assignments, to E. I. du Pont de Nemours & Company, Wilmington, Del., a corporation of Delaware No Drawing. Application March 30, 1940, Serial No. 326,974. In Canada May 5, 1939

2 Claims. (Cl. 260—84)

This invention relates to synthetic resins and more particularly to copolymerized substances comprising methacrylic anhydride, which are capable of use as optical bodies or other shaped articles or as bonds for granular material or for many other purposes.

Various compounds containing a single polymerizable unsaturated methylene group per molecule, such as methyl methacrylate, are considered to polymerize by a rearrangement of the primary valence bonds in such a way as to form linear chains having the unsaturated methylene group as a repeating unit. These linear polymers are ordinarily fusible and soluble, and they may have too low a softening point or be too soluble in various solvents to be capable of use for certain purposes. Methyl methacrylate, for example, is a highly transparent resin having a low absorption of light, a refractive index of about 1.490, a tensile strength of 8,000 to 11,000 pounds per square inch, a softening point of 80 to 125° C. and a Rockwell hardness of 35 to 50, depending on the substances added to aid polymerization. This and other resins containing only one polymerizable unsaturated methylene group would be well suited for optical and other purposes but for the fact that the resin is too soft to be ground and polished by standard operations and it is scratched easily under the ordinary uses to which spectacle lenses and other articles are subjected. One object of this invention is, therefore, to improve the properties of polymerized unsaturated mono-methylene compounds, such as methyl methacrylate, and to make resins which are useful for optical purposes as well as for molded or cast articles and as bonds for granular abrasive material.

I accomplish this object by copolymerizing various compatible and miscible base substances comprising certain monomeric unsaturated mono-methylene compounds or base substances with a suitable amount of methacrylic anhydride which contains two independently polymerizable unsaturated methylene groups in the molecule and thus may serve as a cross linking agent. During polymerization the growing chains incorporate molecules of both substances and form an interpolymer having a three dimensional structure, linkages being established between the chains to an extent depending upon the amount of the cross linking agent used.

Another object of this invention is to copolymerize the anhydride with selected base substances of such characteristics and in such proportions as to provide resins of desired properties.

A further object is to provide a shaped optical body which has high transparency and other required characteristics and which is highly resistant to the abrasion met in the ordinary use thereof.

A further object is to provide a transparent resin which may be ground and polished to form an optical surface.

Another object is to provide a resin which may be cast or shaped to form useful articles.

A still further object is to provide a bond for abrasive grains which will make a satisfactory grinding wheel or other bonded abrasive article. Other objects will be apparent in the following disclosure.

In accordance with this invention, methacrylic anhydride may be copolymerized with one or more of the unsaturated mono-methylene compounds or base substances found in the following groups. These groups comprise the esters of methacrylic acid with the lower monohydric aliphatic and the cyclic alcohols, the aryl substituted monohydric alcohols, and the monohydric phenols including the hydrogenated phenols. The lower monohydric aliphatic alcohols are methyl, ethyl, propyl, isopropyl, butyl, isobutyl and tertiary butyl alcohol, and the amyl alcohols. The preferred aryl substituted monohydric alcohols which may be used to make esters of methacrylic acid are benzyl alcohol, diphenyl carbinol, triphenyl carbinol and cinnamyl alcohol. The preferred phenols for making these esters are phenol, the cresols and alpha and beta-naphthol. The preferred cyclic alcohols are the hydrogenated phenols, such as cyclohexanol and para-cyclohexyl phenol.

Methacrylic anhydride may be made by suitable methods exemplified by the following procedure. 105 grams of methacryl chloride is slowly added to 208 grams of sodium methacrylate suspended in 200 cc. of dry ether. After standing for five or six hours, the sodium chloride is filtered off and the methacrylic anhydride thus produced is washed with dry ether. The ether solution is placed in a distilling flask and the ether is removed under reduced pressure, and the product distilled under vacuum. The distillate boiling between 75 and 85° C./5 mm. is collected. Pure methacrylic anhydride boils at 75° C./5 mm.

Methacrylic anhydride polymerizes to a colorless, brittle, transparent resin having many small cracks, but when used as a cross linking agent in suitable proportions with a linear chain base substance, it will copolymerize therewith and produce a satisfactory body. The cross linking agent and the base substance may be so proportioned as to form a substantially infusible and insoluble body; or the proportions may be so selected that there is insufficient cross linking to form an infusible resin, and the product will then have properties intermediate between that of the linear polymer used as a base substance and that of the highly cross-linked interpolymer. Similarly, the ingredients may be so proportioned as to prevent there being sufficient strain set up within the interpolymer to cause crazing or cracking and yet provide enough cross linkages to produce a body of sufficiently high softening point or hardness characteristics to be serviceable in a given art, such as for making an optical body or a bonded abrasive article. For example, as little as 0.5% by volume of methacrylic anhydride will materially change the properties of methyl methacrylate or other base substance used and form a much harder body of greatly reduced solubility. A copolymer of methyl methacrylate with 5% by volume of methacrylic anhydride is substantially infusible and insoluble, and higher amounts of the anhydride accentuate such properties and render the resin harder and more brittle. I may use as much as 50% of the anhydride for special purposes with various base substances, such as methyl methacrylate; but for optical bodies requiring a minimum of strain I prefer to use not over 7 to 10% of the methacrylic anhydride.

The different esters above listed provide different types of useful compounds when copolymerized with the methacrylic anhydride, and their characteristics differ widely. They may be combined with the anhydride in the same proportions as herein specified and the copolymers may be made by the same procedure, hence the examples pertaining to the use of methyl methacrylate may be considered as applying to the other esters, except that the properties of the different copolymers differ according to the base substance used and the proportions of the ingredients. For example, the copolymers of methacrylic anhydride and methyl methacrylate have a greater tensile strength and hardness and a higher softening point than has polymethyl methacrylate. The hardest resins are formed from the methyl, isopropyl, and tertiary-butyl alcohol esters of methacrylic acid when copolymerized with compatible and miscible amounts of methacrylic anhydride. The copolymers of ethyl, propyl and butyl methacrylates with methacrylic anhydride are transparent resins similar to the copolymers of methyl methacrylate and methacrylic anhydride but somewhat softer. They have a Rockwell hardness between 35 and 55 as compared with about 60 to 62 for the copolymers containing methyl methacrylate, the measurements being made on the Rockwell C scale, using an ⅛ inch ball and a 60 kilogram load.

As a specific example of a resin which may be formed and shaped by a grinding and polishing operation and will serve as an optical body, I may use 93% by volume of monomeric methyl methacrylate and 7% of methacrylic anhydride. The two monomeric liquids may be mixed in the specified proportions and then polymerized in a suitable mold, with or without the aid of a catalyst, such as benzoyl peroxide, and under suitable temperature conditions, such as 60° C. for 24 hours. After subsequently heating the body at 130° C. for 8 to 12 hours, I obtain a transparent resin that may be subjected to a standard optical grinding and polishing operation by means of suitable abrasive grains.

The resin containing 7% of methacrylic anhydride and 93% of methyl methacrylate as thus formed is a substantially flawless, highly transparent, colorless mass free from cracks, which will transmit light and permit the formation of an optical image. Its refractive index for the D line is 1.4925 and its reciprocal dispersion is 59. It is stable to sunlight and ultraviolet light. Its light absorption in the visible spectrum is negligible. The polymer is substantially infusible but may be softened at 130° C. It does not exhibit true plastic flow under heat and pressure but may be bent or deformed and shaped against a mold surface at 160° C. It has a hardness of 60–62 on the Rockwell C scale, 60 kg. load, ⅛ inch ball, 15 seconds. Its impact strength (A. S. T. M. Charpy, notched bar) is 0.54 ft. pound. Its water absorption is 0.67%, and it is unaffected by ethyl alcohol, carbon tetrachloride, ethyl acetate, aqueous acids, textile spirits and 1% ammonia; hence it is highly resistant to standard solvents. It is not softened by boiling water. Its electrical resistivity to direct current is over $10^8$ ohms and its dielectric strength is 440 volts/mil. The resin can be sawed, drilled, turned, ground and polished. It in particular can be ground and polished on an optician's lap to provide an accurate optical surface. Hence, the resin is particularly suitable for use as a lens for various purposes.

For example, an interpolymer of methyl methacrylate polymerized with 20% by volume of monomeric methacrylic anhydride has a tensile strength of 2300 to 2500 pounds/sq. in. at 130° C. Other mixtures may be made which contain from 0.5% to 50% by volume of the anhydride and the properties of the substances will vary accordingly.

The resin containing 7% of the anhydride is well adapted for making spectacle lenses suitable for correcting defective vision; and it may be shaped by standard grinding and polishing operations or by being cut as a flat disk and then hot pressed at 160° C. against suitably shaped mold surfaces, whereby the mass is permanently deformed by a high pressure, such as 1 ton per square inch, and holds the molded shape thus imparted to it. Such a pressed shape may also have its surface polished by suitable abrasive material, if desired. For example, a suitable procedure for making a spectacle lens involves mixing monomeric methacrylic anhydride and one of the base substances, such as methyl methacrylate, in monomeric polymerizable condition, and then polymerizing the mass in a narrow vertical glass mold held in a constant temperature bath at 60° C. for several hours, and thereby forming a sheet of resin as thick as desired. The sheet is heat treated at 130° C. to complete the polymerization and form a stable mass. Disks are cut or died from the sheet and these are thereafter ground and polished on a standard optical glass grinding machine. The product is somewhat resilient and can be dropped or otherwise roughly handled without liability of breakage. Due to its high transparency, as well as its non-breakability under normal usage, the spectacle lenses are more useful than are those made of glass.

It will now be appreciated that other base substances besides the methyl methacrylate given in the above examples may be used with the cross linking agent and that numerous types of products may be made therefrom. It is desirable that the particular base substance and the cross linking agent used be compatible and miscible in the desired proportions and that they polymerize to form a substantially homogeneous body. The relative proportions may be widely varied depending upon the article to be made. Ordinarily I use not over 10% of the methacrylic anhydride with the base substance in the production of lenses, windows or other transparent articles. For making grinding wheel bonds, the proportions will be varied depending upon the relative brittleness required. These may range from about 0.5 to 50% by volume of the anhydride. The product is hard, brittle and glass-like in many of its characteristics and is not rubbery as would be the case if the conjugated methylene compounds, such as chloroprene were used.

Methacrylic anhydride is a very active cross linking agent and the use of too large an amount of this material may tend to set up strains in the body. For certain types of articles, such as an optical lens, which should be substantially free from strain, I prefer to use not over 7 to 10% of the methacrylic anhydride as a hardening agent for the base substance and I may employ a suitable amount of another agent such as methacrylic acid, which is not as active for further increasing the hardness.

That is, methacrylic acid has the capacity of hardening methyl methacrylate because of the presence of the polar acid group, and this substance during polymerization tends to increase the hardness of the copolymer due possibly to the attraction of the polar groups of different molecules for one another. Such a compound, therefore, has a milder hardening action and does not tend to produce cracks although it aids the methacrylic anhydride in increasing the rigidity of the copolymer. The proportion of the secondary hardening agent employed may be widely varied within the limits of miscibility of the monomers and solubility of the copolymer in the monomeric substance. For example, I may use methyl methacrylate and 7% of methacrylic anhydride with 20% of methacrylic acid. Ordinarily I prefer to use not over 30% of the secondary hardening agent which contains but one polymerizable $CH_2=$ group together with not over 7 to 10% of methacrylic anhydride, so as to avoid making too brittle a body. Also, it is preferred that the base substance constitute the major portion of the resin and so largely determine its properties. I may employ two or more of the base substances above mentioned with the cross linking agent.

I may also use with one or more of the base substances and the anhydride any further modifying agent capable of imparting desired properties thereto, such as triphenylmethyl acrylate or methacrylate. The index of refraction of such a triple interpolymer is proportional to the amount of the index modifying agent used and will range between the end values of the substances employed. Hence, by this method, I may modify the refractive index or the dispersion value of the optical body and provide desired characteristics of hardness, solubility, scratch resistance and the like.

The interpolymers may also be used for bonding various types of granular materials, such as abrasive grains, and in such cases the proportion of the modifying agents employed will be governed by the requirements of the final product. The abrasive grains may be crystalline alumina, silicon carbide, boron carbide, diamonds or other suitable granular inert material. The mixture of chosen monomeric substances may be incorporated with the grains in desired proportions and the bond polymerized by heat and/or light, as above set forth. Suitable procedure may be adopted for making such bonded articles in accordance with the methods set forth in the applications of Kistler and Barnes Serial No. 187,549, filed January 28, 1938, now Patent No. 2,218,795; No. 228,004, filed September 1, 1938, now U. S. Patent No. 2,256,618; and No. 316,212, filed January 29, 1940. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, the monomeric polymerizable mixture may be given a desired viscosity, as by dissolving therein a soluble polymer, such as methyl methacrylate or methacrylic acid, and using it only in sufficient amount to form a moldable mass with the grains and be solidified by polymerization in the presence thereof. Other suitable procedures as set forth in the prior applications may be employed with the base substances and the modifying agents herein disclosed.

It is to be understood that while I have attempted to explain this invention in the light of the present accepted theories, yet the claims are not to be construed as dependent on any particular theory relative to the formation of these copolymers. Also, the examples above given are to be interpreted solely as illustrating the invention and not as limitations thereon, except as set forth in the claims appended hereto.

This case is a continuation in part of my application Serial No. 253,625, filed January 30, 1939. The method of making methacrylic anhydride is claimed in my copending application Serial No. 253,624, filed on January 30, 1939.

I claim:

1. A hard copolymer consisting of approximately 93% of methyl methacrylate and approximately 7% of methacrylic anhydride.

2. A hard copolymer consisting of methyl methacrylate and 0.5%–10% of methacrylic anhydride.

CARL E. BARNES.